US009240872B2

(12) United States Patent
Bao et al.

(10) Patent No.: US 9,240,872 B2
(45) Date of Patent: Jan. 19, 2016

(54) METHOD AND DEVICE FOR CONFIGURING PILOT IN WIRELESS COMMUNICATION SYSTEM

(75) Inventors: Dongshan Bao, Beijing (CN); Jing Wang, Beijing (CN); Shenfa Liu, Beijing (CN); Zhigang Yan, Beijing (CN); Feifei Wang, Beijing (CN)

(73) Assignee: BEIJING NUFRONT MOBILE MULTIMEDIA TECHNOLOGY CO., LTD., Beijing (CN)

( * ) Notice: Subject to any disclaimer, the term of this patent is extended or adjusted under 35 U.S.C. 154(b) by 216 days.

(21) Appl. No.: 14/007,576

(22) PCT Filed: Mar. 22, 2012

(86) PCT No.: PCT/CN2012/072790
§ 371 (c)(1),
(2), (4) Date: Sep. 25, 2013

(87) PCT Pub. No.: WO2012/130077
PCT Pub. Date: Oct. 4, 2012

(65) Prior Publication Data
US 2014/0016622 A1 Jan. 16, 2014

(30) Foreign Application Priority Data

Mar. 25, 2011 (CN) .......................... 2011 1 0074598
Apr. 2, 2011 (CN) .......................... 2011 1 0083209
May 19, 2011 (CN) .......................... 2011 1 0130194

(51) Int. Cl.
*H04L 5/00* (2006.01)
*H04L 27/26* (2006.01)

(52) U.S. Cl.
CPC ............ *H04L 5/0048* (2013.01); *H04L 5/0064* (2013.01); *H04L 5/0085* (2013.01); *H04L 27/2657* (2013.01)

(58) Field of Classification Search
CPC ..................................................... H04L 5/0048
See application file for complete search history.

(56) References Cited

U.S. PATENT DOCUMENTS 7,885,604 B2 2/2011 Wee et al.
7,978,732 B2 7/2011 Kim et al.
(Continued)

FOREIGN PATENT DOCUMENTS

CN     1773976 A     5/2006
CN     101048951 A   10/2007

OTHER PUBLICATIONS

Xiaofang Qin, International Search Report, PCT/CN2012/072790, Jul. 5, 2012, 2 pages, State Intellectual Property Office of the P.R. China, Beijing, China.
(Continued)

*Primary Examiner* — Rasheed Gidado
(74) *Attorney, Agent, or Firm* — Anova Law Group, PLLC

(57) ABSTRACT

Disclosed is a method for configuring a pilot frequency in a wireless communication system, comprising: on the basis of at least one item among a current wireless channel characteristic parameter, device capability information of a correspondent node, and system requirement information, configuring in real-time a pilot frequency for different transmissions during a transmission process; and transmitting the configuration result to the correspondent node. Also disclosed is a corresponding device for configuring the pilot frequency. The present invention allows for configuration in real-time of the pilot frequency. This facilitates improved transmission reliability and guaranteed communication quality, and reduces pilot frequency overhead, and at the same time, is applicable in additional number of channel environments and application scenarios.

16 Claims, 3 Drawing Sheets

--- configuring pilots in real time for different transmission in the transmission process, based on at least one of current wireless channel characteristic parameters, device capability information of a communication peer, and system requirement information — S01 sending a configuration result to the communication peer — S02

(56) References Cited

U.S. PATENT DOCUMENTS

| | | | |
|---|---|---|---|
| 8,089,911 B2 | 1/2012 | Huang et al. | |
| 8,179,953 B2* | 5/2012 | Honta | 375/224 |
| 8,243,678 B2* | 8/2012 | Cudak et al. | 370/330 |
| 8,326,324 B2 | 12/2012 | Wu et al. | |
| 8,374,115 B2 | 2/2013 | Huang et al. | |
| 8,446,869 B2 | 5/2013 | Lee et al. | |
| 8,804,688 B2* | 8/2014 | Park et al. | 370/344 |
| 8,982,750 B2 | 3/2015 | Palanki et al. | |
| 2006/0056540 A1 | 3/2006 | Magee | |
| 2007/0104174 A1* | 5/2007 | Nystrom et al. | 370/343 |
| 2008/0075032 A1 | 3/2008 | Balachandran et al. | |
| 2008/0107158 A1* | 5/2008 | Yoshii et al. | 375/146 |
| 2008/0137718 A1* | 6/2008 | Cha et al. | 375/146 |
| 2009/0257519 A1* | 10/2009 | Lin et al. | 375/260 |
| 2010/0238878 A1 | 9/2010 | Jang | |
| 2011/0261781 A1* | 10/2011 | Vrzic et al. | 370/330 |

OTHER PUBLICATIONS

Man Phan, Office Action, U.S. Appl. No. 14/008,958, May 21, 2015, 17 pages, United States Patent and Trademark Office, United States.

* cited by examiner

METHOD AND DEVICE FOR CONFIGURING PILOT IN WIRELESS COMMUNICATION SYSTEM

CROSS-REFERENCE TO RELATED APPLICATION

This application claims priority from PCT Patent Application No. PCT/CN2012/072790 filed on Mar. 22, 2012, which claims priority to Chinese Patent Application No. 201110074598.5 filed on Mar. 25, 2011 titled "METHOD AND SYTEM FOR ADJUSTING DEMODULATION PILOT IN WIRELESS COMMUNICATION SYSTEM", both of which are incorporated herein by reference.

This application claims the priority of Chinese Application No. 201110083209.5 filed on Apr. 02, 2011 and titled "METHOD AND SYSTEM FOR ADJUSTING DEMODULATION PILOT IN WIRELESS COMMUNICATION SYSTEM", which is incorporated herein by reference in its entirety.

This application claims the priority of Chinese Application No. 201110130194.3 filed on May 19, 2011 and titled "COMMUNICATION SYSTEM", which is incorporated herein by reference in its entirety.

FIELD OF THE INVENTION

The present invention relates to the wireless communication technology field, particularly, relates to a method and device for configuring a pilot in a wireless communication system.

BACKGROUND OF THE INVENTION

The Orthogonal Frequency Division Multiplexing (OFDM) technology can overcome frequency selective fading in a broadband mobile channel with low complexity, and thus is widely used in various broadband mobile communication systems. In order to correlatively detect each OFDM data subcarrier symbol, a pilot plays an important role in the system. Through the pilot symbols, the receiver estimates a wireless channel H, and then assists the equalizer or demodulator to equalize the channel or related detected data symbols. In addition to the correlation detection or demodulation function, the pilot is used in the system for measuring the quality or state of the wireless channel, and aiding the scheduler to implement functions such as frequency selective scheduling and link adaptation.

The Multiple Input Multiple Output (MIMO) multiple antenna technology can improve the reliability and capacity of a wireless communication system by utilizing space scattering characteristics of the wireless propagation channel, and thus is also applied widely in various types of wireless systems. The MIMO-OFDM technology has become the default configuration in a broadband mobile communication system. In recent years, the function of the pilot is more refined in the MIMO-OFDM system. For example, the LTE-Advanced system specifically sets a pilot and a measurement pilot, which are respectively used for the system correlation detection and channel measurement functions. The reason for this design is that a multi-antenna pre-coding technology is used in MIMO systems, and particularly when the pre-coding matrix is unknown by the receiver, the pilot has to be pre-coded along with data symbols, but the pre-coding per se can somewhat change frequency domain characteristics of the mobile channel. Therefore, the pilot and the measurement pilot have to be separated.

In various existing mobile communication systems or wireless LAN systems, the pilot is usually fixedly configured in the system according to a certain pattern. Take an LTE-Advanced system as an example, in each time-frequency Resource Block (RB), the pilot configuration is shown in FIG. 1, wherein a physical downlink control channel (PDCCH) in the LTE system is used to allocate various resources for uplink and downlink transmission in the entire system, and plays an crucial schedule role in the system. The physical downlink shared channel (PDSCH) is used for transmission of signaling at the service or control plane, where CRS is a common pilot and DMRS is a dedicated pilot. Depending on spatial data streams transmitted in parallel, the number of ports for the pilot may vary, but the time domain pilot density and the frequency domain pilot density are constant which has been determined in the system specifications.

In 802.11 wireless LAN systems, the pilot is also fixed in each physical frame header, i.e. a long training sequence. Regardless of the length of the transmission cycle, the propagation environment and the used transmission format, the configuration of the pilot does not change.

As well known, the mobile channel is complex and changeable, and in different propagation environments, the mobile channel's frequency selective fading, time selective fading and space selective fading will be significantly different. Using pilot in fixed pattern is not conducive to its adaption to a complex, and changing mobile communication environment, and further causes certain loss in the system capacity. Take LTE-Advanced as an example: when the terminal operates in indoor environment, due to its lower moving speed, the mobile channel has a longer correlation time (>10 ms). However, whatever the correlation time is, there will be a constant repetition for the pilot in each sub-frame (1 ms) in LTE-A system. Take 802.11 system as an example again: when the system works in outdoor hotspot, due to the rapid change of surrounding environment, for example: the movement of the car, even if the terminal is stationary, the channel between the AP and the terminal will still have a Doppler spread, and thereby forming time selective fading. But no matter how the environment changes, the 802.11 system's pilot function will be borne by the long training sequence which has a fixed location in the physical frame. Thus, the fixed pilot can't adapt to environmental change.

SUMMARY OF THE INVENTION

The present invention provides a method and device for configuring pilots in a wireless communication system, to adaptively configure the pilots, and improve system performance.

The technical solutions of the present invention are implemented as follows.

A method of configuring a pilot in a wireless communication system, including:

configuring pilots in real time for different transmission in the transmission process, based on at least one of current wireless channel characteristic parameters, device capability information of a communication peer, and system requirement information; and sending a configuration result to the communication peer.

In an embodiment, configuring pilots in real time includes:

configuring a time domain pilot density to be within a preset time domain density range corresponding to at least one of the current wireless channel characteristic parameters, device capability information of a communication peer and system requirement information;

and/or configuring a frequency domain pilot density to be within a preset frequency domain density range corresponding to at least one of the current wireless channel characteristic parameters, device capability information of a communication peer and system requirement information.

Optionally, the wireless channel characteristic parameters include: a wireless channel correlation bandwidth and wireless channel correlation time;

the wider the wireless channel correlation bandwidth is, the less the corresponding frequency domain density within the preset the frequency domain density range is; and the longer the wireless channel correlation time is, the less the corresponding time domain density within the preset the time density range is.

Optionally, the device capability information of the communication peer includes: frequency synchronization accuracy and/or sampling phase synchronization accuracy;

the higher the frequency synchronization accuracy is, the less the corresponding time domain density within the preset time domain density range is, and the less the corresponding frequency domain density within preset frequency domain density range; and the higher the sampling phase synchronization accuracy is, the less the corresponding time domain density within the preset time domain density range is, and the less the corresponding frequency domain density within the preset frequency domain density range is.

Optionally, configuring the time domain pilot density to be within the preset time domain density range corresponding to the device capability information of the communication peer includes: configuring the time domain pilot density to be within the preset time domain density range corresponding to at least one of the frequency synchronization accuracy and the sampling phase synchronization accuracy; and configuring the frequency domain pilot density to be within the preset frequency domain density range corresponding to the device capability information of the communication peer includes: configuring the frequency domain pilot density to be within the preset frequency domain density range corresponding to at least one of the frequency synchronization accuracy and the sampling phase synchronization accuracy.

Optionally, the system requirement information includes a modulation format;

the higher the modulation order is, the larger the corresponding time domain density within the preset time domain density range is, and the larger the corresponding frequency domain density within the preset frequency domain density range is.

Optionally, the system requirement information further includes a coding scheme and/or a code rate;

after being configured to be within the preset time domain density range corresponding to the system requirement information, the time domain pilot density is further finely adjusted according to a preset time domain adjustment value corresponding to the coding scheme and/or the code rate; and after being configured to be within the preset frequency domain density range corresponding to the system requirement information, the frequency domain pilot density is further finely adjusted according to a preset frequency domain adjustment value corresponding to the coding scheme and/or the code rate.

Optionally, the system requirement information includes at least one of a modulation format, a coding scheme and a code rate;

the higher a modulation order is, the larger the corresponding time domain density within the preset time domain density range is, and the greater the corresponding frequency domain density within the preset frequency domain density range is;

the higher a code word error correction capability is, the less the corresponding time domain density within the preset time domain density range is, and the less the corresponding frequency domain density within the preset frequency domain density range is; and the higher the code rate is, the larger the corresponding time domain density within the preset time domain density range is, and the larger the corresponding frequency domain density within the preset frequency domain density range is.

Optionally, configuring the time domain pilot density to be within the preset time domain density range corresponding to the system requirement information includes: configuring the time domain pilot density to be within the preset time domain density range corresponding to at least one of the modulation format, the code word error correction capability and the code rate; and configuring the frequency domain pilot density to be within the preset frequency domain density range corresponding to the system requirement information includes: configuring the frequency domain pilot density to be within the preset frequency domain density range corresponding to at least one of the modulation format, the code word error correction capability and the code rate.

Optionally, when configuring the time domain pilot density and the frequency domain pilot density, the method further includes:

in a resource block, setting a preset OFDM symbol as a starting insertion location, determining OFDM symbols into which the pilots are to be inserted according to a result of configuring the time domain pilot density, then setting a preset subcarrier as the starting insertion location for each of the OFDM symbols into which the pilots are to be inserted, and inserting the pilots according to a result of configuring the frequency domain pilot density.

Optionally, when configuring the time domain pilot density, the method further includes:

in a resource block, setting a preset OFDM symbol as a starting insertion location, determining OFDM symbols into which the pilots are to be inserted according to a result of configuring the time domain pilot density, and then inserting the pilots in preset subcarriers for each of the OFDM symbols into which the pilots are to be inserted.

Optionally, when configuring the frequency domain pilot density, the method further includes:

in a resource block, setting a preset subcarrier as a starting insertion location, determining subcarriers into which the pilots are to be inserted according to a result of configuring the frequency domain pilot density, and inserting the pilots in the preset OFDM symbols for each of the subcarriers into which the pilots are to be inserted.

In an embodiment, sending the configuration result to the communication peer specifically includes:

carrying information indicating the pilot configuration result in the signal sent to the communication peer;

or, sending signaling used to indicate the pilot configuration result to the communication peer via a control channel.

A device of configuring a pilot in a wireless communication system, including:

a configuring unit, which is adapted to configure pilots in real time for different transmission in the transmission process based on at least one of current wireless channel characteristic parameters, device capability information of a communication peer, and system requirement information; and a transmitting unit, which is adapted to send a configuration result from the configuration unit to the communication peer.

in an embodiment, the configuring unit is adapted to configure a time domain pilot density to be within a preset time domain density range corresponding to at least one of the current wireless channel characteristic parameters, device capability information of the communication peer, and system requirement information; and/or to configure a frequency domain pilot density to be within a preset frequency domain density range corresponding to at least one of the current wireless channel characteristic parameters, device capability information of the communication peer, and system requirement information.

Optionally, the wireless channel characteristic parameters include: a wireless channel correlation bandwidth and wireless channel correlation time;

the wider the wireless channel correlation bandwidth is, the less the corresponding frequency domain density within the preset the frequency domain density range is; and the longer the wireless channel correlation time is, the less the corresponding time domain density within the preset the time density range is.

Optionally, the device capability information of the communication peer includes: frequency synchronization accuracy and/or sampling phase synchronization accuracy;

the higher the frequency synchronization accuracy is, the less the corresponding time domain density within the preset time domain density range is, and the less the corresponding frequency domain density within preset frequency domain density range; and the higher the sampling phase synchronization accuracy is, the less the corresponding time domain density within the preset time domain density range is, and the less the corresponding frequency domain density within the preset frequency domain density range is.

Optionally, the configuring unit configures the time domain pilot density to be within the preset time domain density range corresponding to the device capability information of the communication peer by configuring the time domain pilot density to be within the preset time domain density range corresponding to at least one of the frequency synchronization accuracy and the sampling phase synchronization accuracy; and the configuring unit configures the frequency domain pilot density to be within the preset frequency domain density range corresponding to the device capability information of the communication peer by configuring the frequency domain pilot density to be within the preset frequency domain density range corresponding to at least one of the frequency synchronization accuracy and the sampling phase synchronization accuracy.

Optionally, the system requirement information includes a modulation format;

the higher the modulation order is, the larger the corresponding time domain density within preset time domain density range is, and the larger the corresponding frequency domain density within the preset frequency domain density range is.

Optionally, the system requirement information further includes a coding scheme and/or a code rate;

after configuring the time domain pilot density to be within the preset time domain density range corresponding to the system requirement information, the configuring unit further finely adjusts the time domain pilot density according to a preset time domain adjustment value corresponding to the coding scheme and/or the code rate; and after configuring the frequency domain pilot density to be within the preset frequency domain density range corresponding to the system requirement information, the configuring unit further finely adjusts the frequency domain pilot density according to a preset frequency domain adjustment value corresponding to the coding scheme and/or a code rate.

Optionally, the system requirement information includes at least one of a modulation format, a coding scheme and a code rate;

the higher a modulation order is, the larger the corresponding time domain density within the preset time domain density range is, and the greater the corresponding frequency domain density within the preset frequency domain density range is;

the higher a code word error correction capability is, the less the corresponding time domain density within the preset time domain density range is, and the less the corresponding frequency domain density within the preset frequency domain density range is; and the higher the code rate is, the larger the corresponding time domain density within the preset time domain density range is, and the larger the corresponding frequency domain density within the preset frequency domain density range is.

Optionally, the configuring unit configures the time domain pilot density to be within the preset time domain density range corresponding to the system requirement information by configuring the time domain pilot density to be within the preset time domain density range corresponding to at least one of the modulation format, the code word error correction capability and the code rate; and the configuring unit configures the frequency domain pilot density to be within the preset frequency domain density range corresponding to the system requirement information by configuring the frequency domain pilot density to be within the preset frequency domain density range corresponding to at least one of the modulation format, the code word error correction capability and the code rate.

Optionally, the configuring unit includes:
a setting module, which is adapted to, in a resource block, set a preset OFDM symbol as a starting insertion location, determine OFDM symbols into which the pilots are to be inserted according to a result of configuring the time domain pilot density, then set a preset subcarrier as the starting insertion location for each of the OFDM symbols into which the pilots are to be inserted, and insert the pilots according to a result of configuring the frequency domain pilot density.

Optionally, the configuring unit includes:
a setting module, which is adapted to, in a resource block, set a preset OFDM symbol as a starting insertion location, determine OFDM symbols into which the pilots are to be inserted according to a result of configuring the time domain pilot density, and then insert the pilots in preset subcarriers for each of the OFDM symbols into which the pilots are to be inserted.

Optionally, the configuring unit includes:
a setting module, which is adapted to, in a resource block, set a preset subcarrier as a starting insertion location, determine subcarriers into which the pilots are to be inserted according to a result of configuring the frequency domain pilot density, and insert the pilots in the preset OFDM symbols for each of the subcarriers into which the pilots are to be inserted.

In an embodiment, the transmitting unit carries information indicating the pilot configuration result in the signal sent to the communication peer; or, sends signaling used to indicate the pilot configuration result to the communication peer via a control channel.

As can be seen from the above, in the pilot adjustment solution provided in the present invention, an appropriate number of pilots are configured for different transmission depending on the device capabilities, system requirements, characteristics of a channel between the transmitter and the receiver. When wireless propagation environment between the transmitter and the receiver changes, the pilot configuration is also varied with the propagation environment. In accordance with the invention, the configuration of pilots may be adjusted depending on not only the device capabilities and system requirements, but also the wireless propagation environment, so that the pilot configuration may be adapted to any change of the communication link, thereby improving transmission reliability as well as increasing average system capacity.

DETAILED DESCRIPTION OF THE INVENTION

In view of the deficiencies in the prior art, the present invention proposes a pilot configuration method for a wireless communication system to adaptively configure pilots according to mobile communication environment changes, device capabilities and system requirements, and the method is applicable to various wireless communication systems.

The concept of the invention includes: based on at least one of current device capability information of a communication peer, current system requirement information, and characteristics of a wireless channel between the transmitter and the receiver, configuring pilots in real time for different transmission in the transmission process.

Figure 1:
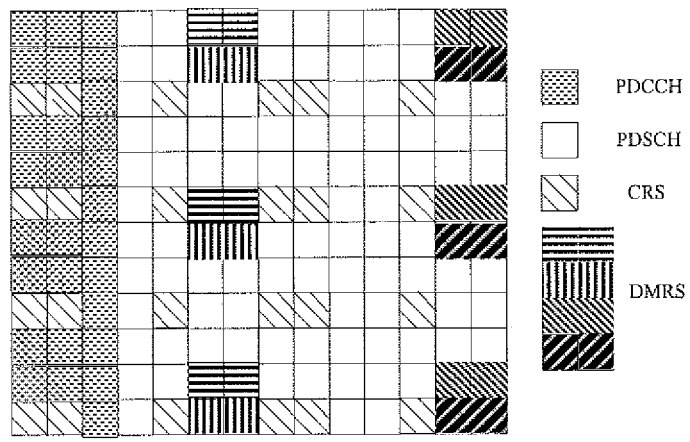
FIG. 1 is a schematic diagram showing the pilot configuration in each time-frequency resource block of an LTE-Advanced system in the prior art.
Figure 2:
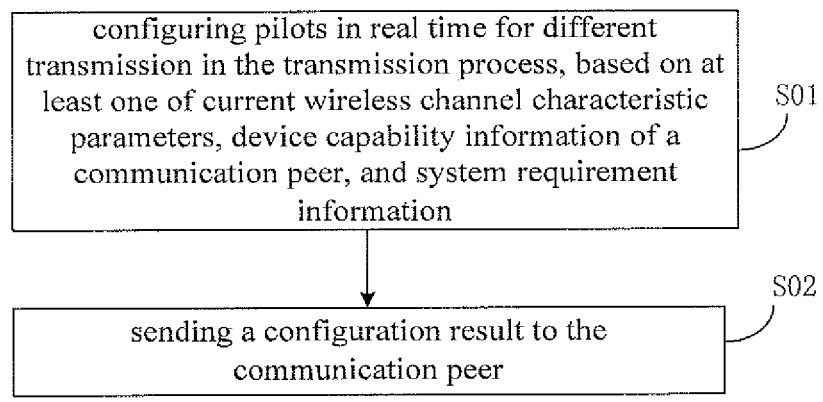
FIG. 2 is a flowchart showing a pilot configuration method in the wireless communication system provided by the present invention.

Referring to FIG. 2, the invention provides a method of configuring a pilot in a wireless communication system, and the method includes the following steps S01-S02.

At step S01, pilots are configured in real time for different transmission in the transmission process, based on at least one of current wireless channel characteristic parameters, device capability information of a communication peer, and system requirement information.

The different transmission includes transmission with different communication peers, or different occurrences of transmission with the same communication peer, etc.

At step S02, the configuration result is sent to the communication peer.

As an alternative example, configuring pilots in real time in step S01 includes: configuring a time domain pilot density and/or a frequency domain pilot density. If only the time domain pilot density is configured, the frequency domain pilot density may be predetermined and constant; and if only the frequency domain pilot density is configured, the time domain pilot density may be preset and remain unchanged.

Further, different time domain density ranges and frequency domain density ranges are preset for different wireless channel characteristic parameters, different time domain density ranges and frequency domain density ranges are preset for different device capability information, and different time domain density ranges and frequency domain density ranges are preset for different system requirement information. Each of the time domain density ranges and the frequency domain density ranges contains more than one specific density.

In this case, in configuring the time domain pilot density, the time domain pilot density is configured to be within the preset time domain density range corresponding to at least one of the current wireless channel characteristic parameters, device capability information of a communication peer, and system requirement information. In configuring the frequency domain pilot density, the frequency domain pilot density is configured to be within the preset frequency domain density range corresponding to at least one of the current wireless channel characteristic parameters, device capability information of a communication peer, and system requirement information.

Specifically, if the pilot is configured based on only one of the wireless channel characteristics parameters, device capability information of a communication peer, and system requirement information, then, in configuring the time domain pilot density, the time domain pilot density is configured to be within the preset time domain density range corresponding to the information; and in configuring the frequency domain pilot density, the frequency domain pilot density is configured to be within the preset frequency domain density range corresponding to the information.

If the pilot is configured based on at least two of the wireless channel characteristics parameters, device capability information of a communication peer and system requirement information, then, in configuring the time domain pilot density, the preset time domain density ranges corresponding to said at least two of the wireless channel characteristics parameters, device capability information of a communication peer and system requirement information are determined respectively, and if the determined two or more density ranges are similar or identical, for example, two of the density ranges overlap, then the time domain pilot density is configured to be within both of the preset time domain density ranges corresponding to the two information on which the configuration is based; and if the determined two or more density ranges differentiate significantly from each other, for example, there is no common portion between two of the density ranges, one of the two density ranges is selected depending on the actual application requirements or predetermined criteria, and the time domain pilot density is configured to be within the selected density range; and in configuring the frequency domain pilot density, the preset frequency domain density ranges corresponding to said at least two of the wireless channel characteristics parameters, device capability information of a communication peer and system requirement information are determined respectively, and if the determined two or more density ranges are similar or identical, for example, two of the density ranges overlap, then the frequency domain pilot density is configured to be within both of the preset frequency domain density ranges corresponding to the two information on which the configuration is based; and if the determined two or more density ranges differentiate significantly from each other, for example, there is no common portion between two of the density ranges, one of the two density ranges is selected depending on the actual application requirements or predetermined criteria, and the frequency domain pilot density is configured to be within the selected density range.

For example, in configuring the time domain pilot density based on both wireless channel characteristics parameters and system requirement information, if it is determined that a pilot is to be inserted every 16 OFDM symbols based on the wireless channel characteristics parameters, and it is determined that a pilot is to be inserted every 8 OFDM symbols based on the system requirement information, then the time domain pilot density is configured in such a way that a pilot is inserted every 8 OFDM symbols in accordance with the actual application requirements or predetermined criteria.

The wireless channel characteristic parameters, device capability information of the communication peer and system requirement information each may include a variety of specific parameters, based on which various embodiments are provided for illustrating real-time configuration of pilots below.

As an alternative embodiment, the wireless channel characteristic parameters may include: wireless channel correlation time and a wireless channel correlation bandwidth. The wider the wireless channel correlation bandwidth is, the less the corresponding frequency domain density within the preset the frequency domain density range is; and the longer the wireless channel correlation time is, the less the corresponding time domain density within the preset the time density range is.

In this case, if the pilot is configured in real time only based on the current wireless channel characteristic parameters, then in the configuration of the time domain pilot density, the time domain pilot density is configured to be within the present time domain density range corresponding to the current wireless channel correlation time; and in the configuration of the pilot frequency domain density, the pilot frequency domain density is configured to be within the preset frequency domain density range corresponding to the current wireless channel correlation bandwidth.

As an alternative embodiment, device capability information of the communication peer may include: a frequency synchronization accuracy and/or a sampling phase synchronization accuracy. The higher the frequency synchronization accuracy is, the less the corresponding time domain density within the preset time domain density range is, and the less the corresponding frequency domain density within preset frequency domain density range; and the higher the sampling phase synchronization accuracy is, the less the corresponding time domain density within the preset time domain density range is, and the less the corresponding frequency domain density within the preset frequency domain density range is.

In this case, in configuring a pilot based on only the current device capability information of the communication peer, the real-time pilot configuration includes that:

if the pilot is configured based on one of the frequency synchronization accuracy and the sampling phase synchronize accuracy, then in configuring the time domain pilot density, the time domain pilot density is configured to be within the preset time domain density range corresponding to the information on which the configuration is based; and in configuring the frequency domain pilot density, the frequency domain pilot density is configured to be within the preset frequency domain density range corresponding to the information on which the configuration is based;

and if the pilot is configured based on both the frequency synchronization accuracy and the sampling phase synchronize accuracy, then in configuring the time domain pilot density, preset time domain density ranges corresponding to the current frequency synchronization accuracy and the current sampling phase synchronize accuracy are determined respectively, and if it is determined that the determined two density ranges are similar or identical, for example, there is a common portion between these two density ranges, then the time domain pilot density is configured to be within both of the preset time domain density ranges corresponding to the frequency synchronization accuracy and the sampling phase synchronize accuracy; and if it is determined that the determined two density ranges differentiate from each other significantly, for example, there is no common portion between these two density ranges, then one of the density ranges is selected depending on the actual application requirements or predetermined criteria, and the time domain pilot density is configured to be within the selected density range; and in configuring the time domain pilot density, preset frequency domain density ranges corresponding to the current frequency synchronization accuracy and the current sampling phase synchronize accuracy are determined respectively, and if it is determined that the determined two density ranges are similar or identical, for example, there is a common portion between these two density ranges, then the frequency domain pilot density is configured to be within both of the preset frequency domain density ranges corresponding to the frequency synchronization accuracy and the sampling phase synchronize accuracy; and if it is determined that the determined two density ranges differentiate from each other significantly, for example, there is no common portion between these two density ranges, then one of the density ranges is selected depending on the actual application requirements or predetermined criteria, and the frequency domain pilot density is configured to be within the selected density range.

For example, if different clock sources are used for the above-described frequency synchronization accuracy and phase synchronize sampling accuracy, the accuracies may likely differentiate from each other significantly. For example, in configuring the time domain pilot density, the preset time domain density ranges respectively corresponding to the frequency synchronization accuracy and the phase synchronize sampling accuracy may differentiate from each other significantly, in this case, the preset time domain density range corresponding to the poor one from the accuracies may be chosen for pilot configuring.

In an alternative embodiment, the system requirement information includes a modulation format, which specifically refers to a modulation order. The higher a modulation order is, the larger the corresponding time domain density within the preset time domain density range is, and the greater the corresponding frequency domain density within the preset frequency domain density range is.

In this case, in configuring a pilot based on current system requirement information only, the real-time pilot configuring includes:

in configuring a time domain pilot density, the time domain pilot density is configured to be within the preset time domain density range corresponding to the modulation order; and in configuring a pilot frequency domain density, the frequency domain pilot density is configured to be within the preset frequency domain density range corresponding to the modulation order.

Further, the system requirement information may also include a coding scheme and/or a code rate, wherein the coding scheme specifically refers to a code word error correction capability, and the code rate specifically refers to a coding rate. The code word error correction capability corresponds to a preset time domain adjustment value and a preset frequency domain adjustment value, and the code rate corresponds to a preset time domain adjustment value and a preset frequency domain value. These various preset adjustment values are determined depending on the actual system performance.

In this case, during real-time pilot configuring, after the time domain pilot density is configured based on the modulation order, the density may be further finely adjusted according to the preset time domain adjustment value corresponding to the coding scheme and/or the code rate. After the frequency domain pilot density is configured based on the modulation order, the density may be further finely adjusted according to the preset frequency domain adjustment value corresponding to the coding scheme and/or the code rate.

As an alternative embodiment, the system requirement information includes at least one of a modulation format, a coding scheme and a code rate. The modulation format specifically refers to a modulation order, the coding scheme specifically refers to a code word error correction capability, and the code rate specifically refers to a coding rate. The higher a modulation order is, the larger the corresponding time domain density within the preset time domain density range is, and the greater the corresponding frequency domain density within the preset frequency domain density range is; the higher a code word error correction capability is, the less the corresponding time domain density within the preset time domain density range is, and the less the corresponding frequency domain density within the preset frequency domain density range is; and the higher the code rate is, the larger the corresponding time domain density within the preset time domain density range is, and the larger the corresponding frequency domain density within the preset frequency domain density range is.

In this case, if a pilot is configured based on the current system requirement information only, the real-time pilot configuring includes that:

if the pilot is configured based upon only one of the modulation format, the coding scheme and the code rate, then in configuring a time domain pilot density, the time domain pilot density is configured to be within the preset time domain density range corresponding to said one of the modulation format, the coding scheme and the code rate on which the configuration is based; and in configuring a frequency domain pilot density, the frequency domain pilot density is configured to be within the preset frequency domain density range corresponding to said one of the modulation format, the coding scheme and the code rate on which the configuration is based.

If the pilot is configured based on at least two of the modulation format, the coding scheme and the code rate, then in configuring the time domain pilot density, preset time domain density ranges corresponding to two or more of the modulation format, the coding scheme and the code rate on which the configuration is based are respectively determined, and if the determined two or more density ranges are similar or identical, for example, there is a common portion between the two or more density ranges, the time domain pilot density is configured to be within both of the preset time domain density ranges corresponding to said two or more of the modulation format, the coding scheme and the code rate on which the configuration is based; and if the determined two or more density ranges differentiate from each other significantly, for example, there is no common portion between the two or more density ranges, one of the density ranges is selected depending on the actual application requirements or predetermined criteria, and the time domain pilot density is configured to be within the selected density range; and in configuring the frequency domain pilot density, preset frequency domain density ranges corresponding to two or more of the modulation format, the coding scheme and the code rate on which the configuration is based are respectively determined, and if the determined two or more density ranges are similar or identical, for example, there is a common portion between the two or more density ranges, the frequency domain pilot density is configured to be within both of the preset frequency domain density ranges corresponding to said two or more of the modulation format, the coding scheme and the code rate on which the configuration is based; and if the determined two or more density ranges differentiate from each other significantly, for example, there is no common portion between the two or more density ranges, one of the density ranges is selected depending on the actual application requirements or predetermined criteria, and the frequency domain pilot density is configured to be within the selected density range.

The pilot configuration method provided in the present invention achieves the following technical effects:

first, when the pilot is configured based on the device capability information of the communication peer, the reliability of transmission is improved and the communication quality is ensured;

secondly, when the pilot is configured based on system requirement information, it is possible to adapt to a change of system requirements, to reducing pilot overhead; and thirdly, while the pilot is configured based on wireless channel characteristics parameters, the pilot configuration may be adapted to any communication link changes, to be suitable for more channel environment and application scenarios.

To make the principles, features and advantages of the present invention more clear, the present invention is described in detail below with reference to the particular application examples. In the following embodiments, the configuration is conducted at a center access point (CAP), and a station (STA) is used as a communication peer of the CAP, and a demodulating pilot is used as an example for configuring.

A FIRST APPLICATION EXAMPLE

In the present application example, a CAP configures pilots based on current wireless channel characteristic parameters.

The CAP may obtain the current wireless channel characteristic parameters by many ways, for example, by channel measuring, or by information interacting with the STA.

In this application example, it is assumed that a station STA1 is in a moving state and stations STA2 and STA0 are rest.

The CAP may obtain correlation time of the stations STA0, STA1, and STA2 by channel measurement (e.g., Doppler spectral measurements), and obtain correlation bandwidths of the stations STA0, STA1, and STA2 through channel measurements (such as power delay spectral measurement). Specifically, the wireless channel correlation time of the moving station STA1 is less than that of the stations STA0 and STA2 in the rest state, and the wireless channel correlation bandwidth of the moving station STA1 is less than that of the stations STA0 and STA2 in the rest state.

If both time domain pilot density and frequency domain pilot density are configured at present, the configuring process specifically includes Steps 1 and 2 below.

At Step 1, a time domain pilot density is configured based on the wireless channel correlation time.

Figure 3:
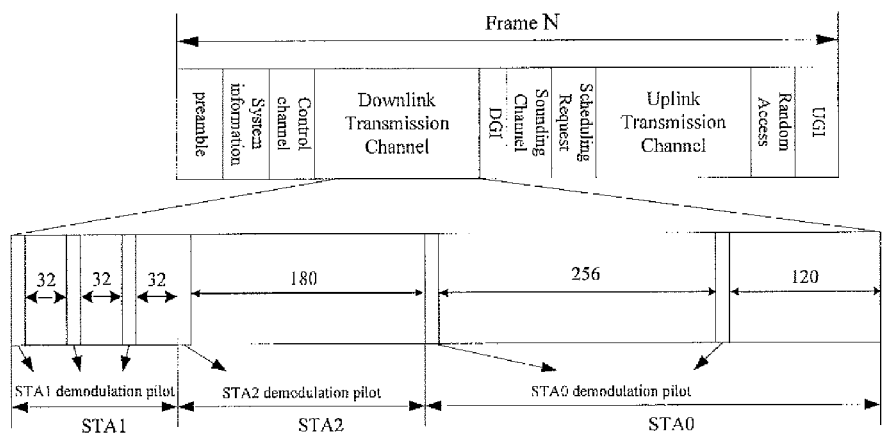
FIG. 3 is a schematic diagram of a pilot configured in an embodiment of the present invention.

For example, a result of pilot configuring by the CAP in the time domain is shown in FIG. 3. Specifically, a set of pilots are configured for the station STA1 every 32 OFDM symbols, and a set of pilots are configured for the stations STA0 and STA2 every 256 OFDM symbols.

At Step 2, a frequency domain pilot density is configured based on the wireless channel correlation bandwidth.

For example, the CAP configures a set of pilots for the station STA1 every 2 used subcarriers, and configures a set of pilots for the stations STA0 and STA2 every 4 used subcarriers.

Via a control channel used for indicating resource scheduling, the CAP configures a number of signaling bits (such as 1-2 bits) to indicate the configured time domain pilot period (i.e. an interval of OFDM symbols) and frequency domain pilot period (i.e. an interval of subcarriers).

As for downlink data transmission, for example, the CAP inserts pilots during downlink transmission according to the configuration result by operations as follows: in a resource block allocated to the STA, the first OFDM symbol is taken as a starting insertion location for pilot in the time domain, then OFDM symbols into which the pilots are to be inserted are determined according to a configuration result of the time domain pilot density, and then for each of the OFDM symbols into which the pilots are to be inserted, the first subcarrier is taken as a starting insertion location for pilot, and pilots are inserted in accordance with a configuration result of the frequency domain pilot density.

In addition to the configuration process described above, it is possible to configure either the time domain pilot density or the frequency domain pilot density only.

In configuring the time domain pilot density only, to insert pilots during downlink data transmission, the CAP takes the first OFDM symbol as an insertion position for pilot in the time domain within a resource block allocated to the STA, determines OFDM symbols into which pilots are to be inserted according to a configuration result of the time domain pilot density, and then inserts a pilot into the preset subcarrier for each of the OFDM symbols into which the pilots are to be inserted.

In configuring frequency domain pilot density only, to insert pilots during downlink data transmission, the CAP takes the first subcarrier as an insertion position for pilot within a resource block allocated by the STA, determines OFDM symbols into which pilots are to be inserted according to a configuration result of the frequency domain pilot density, and then inserts a pilot in the preset OFDM symbol for each of the subcarriers into which pilots are to be inserted.

The pilot inserted by the CAP may occupy one or more continuous OFDM symbols in the time domain, and the number of OFDM symbols occupied in the time domain by the pilot to be inserted can be determined by the CAP according to the number of space-time streams.

In the uplink transmission, the STA inserts pilots in a resource block according to the configuration result informed by the CAP, and the pilots are inserted in a way same as that of the CAP.

In the present application example, the pilot configuration is adjusted according to conditions of the wireless channel between the STA and the CAP, for adapting to communication link changes, to improve the reliability of transmission and ensure the communication quality, and further increase the average system capacity, meantime, it is applicable to more channel environments and application scenarios.

A SECOND APPLICATION EXAMPLE

In the present application example, the CAP configures the pilot based on the device capability information of the communication peer.

Figure 4:
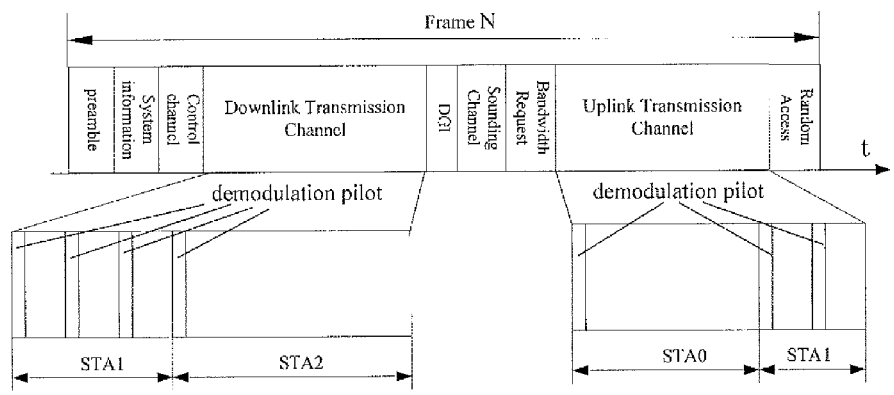
FIG. 4 is a diagram showing the structure of a transmission frame in an embodiment of the present invention.

The CAP interacts with stations STA1 and STA2 for device capabilities. To overcome the affection of a synchronization error on OFDM data symbol detection, the CAP has to transmit a set of pilots periodically, to correct phase offset accumulation caused by the synchronization error. Pilots configured for the station SAT1 are contained in a downlink transmission channel in the transmission frame structure as shown in FIG. 4.

The CAP may acquire the device capability information of the communication peer by various ways, for example, by capability negotiating with the STA.

Assuming that the station STA1 is a low-end device with significant sampling synchronization error and frequency synchronization error. The station STA2 is a high-end device with small sampling synchronization error and frequency synchronization error. The sampling synchronization errors accumulate along with increasing OFDM symbols.

If a time domain pilot density and a frequency domain pilot density are configured based on the current frequency synchronization accuracy, the configuring process specifically includes the following Steps 1 and 2.

At Step 1, the time domain pilot density is configured base on the frequency synchronization accuracy.

Figure 5:
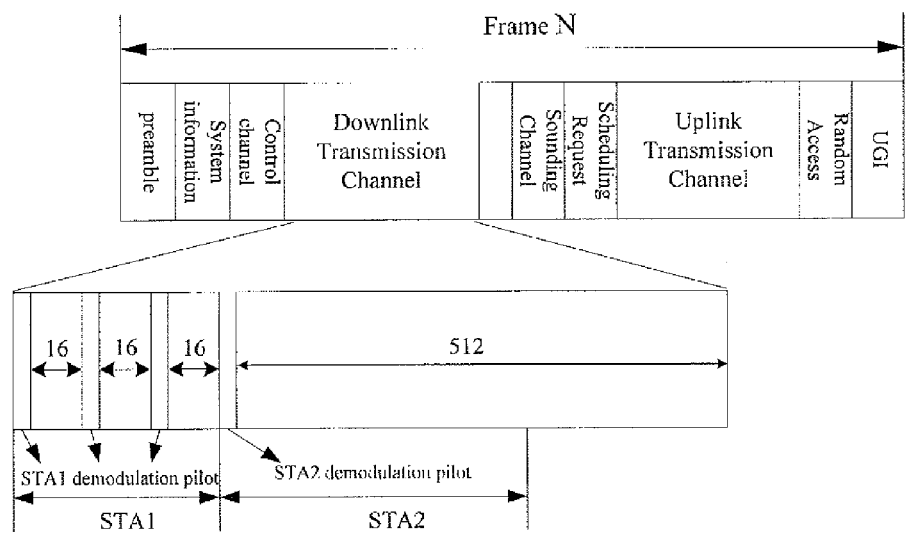
FIG. 5 is a schematic diagram of a pilot configured in another embodiment of the present invention.

For example, the configuration result by the CAP is shown in FIG. 5. Specifically, a set of pilots are configured for the station STA1 every 16 OFDM symbols, and a set of pilots are configured for the station STA2 every 512 OFDM symbols.

Step 2, the pilot is configured in the frequency domain based on the frequency synchronization accuracy.

For example, a set of pilots are configured for the station STA1 every 2 used subcarriers, and a set of pilots are configured for the station STA2 every 4 used subcarriers.

In a control channel used for indicating resource scheduling, the CAP configures a number of signaling bits (such as 1-2 bits) to indicate a time domain pilot period and a frequency domain pilot period.

As for downlink data transmission, for example, the CAP inserts pilots during downlink transmission according to the configuration result by operations as follows: in a resource block allocated to the STA, the first OFDM symbol is taken as a starting insertion location for pilot, then OFDM symbols into which the pilots are to be inserted are determined according to a configuration result of the time domain pilot density, and then for each of the OFDM symbols into which the pilots are to be inserted, the first subcarrier is taken as a starting insertion location for pilot, and pilots are inserted in accordance with a configuration result of the frequency domain pilot density.

In the uplink transmission, the STA inserts a pilot into a resource block according to a configuring result informed by the CAP, and the way of inserting the pilot is the same as that of the CAP.

In the present application example, the pilot configuration is adjusted based on the device capability information of the STA, and different pilot configuration is used for the STAs with different device capabilities, to improve transmission reliability and ensure the communication quality.

A THIRD APPLICATION EXAMPLE

In the present application example, the pilot is configured according to the system requirement information, which is known to the CAP.

In the wireless communication system, the station STA1 is closer to the CAP, while the station STA2 is farther to the CAP.

In this application example, the pilot is configured based on the modulation order and the code rate, respectively.

During the downlink transmission, the station STA1 is closer to the CAP, so that a link propagation loss is small and the power of a signal received by the station STA1 is high, thus a high-order modulation scheme such as 64 QAM may be employed for data transmission. The station STA2 is farther from the CAP, so that the link propagation loss is relative large and the power of a signal received by the station STA2 is low, thus a low-order modulation scheme such as QPSK is employed for data transmission. Since the high-order modulation is more sensitive to a channel fast fading than the low-order modulation, the CAP configures a higher pilot density for the station STA1 but a lower pilot density for the station STA2.

In addition, if the station STA1 employs a higher coding rate but the station STA2 employs a lower coding rate considering the channel environment, more density pilots (i.e., a higher pilot density) is configured for the station STA1 in the frequency domain and the time domain, to accommodate such a code rate change, and ensure communication reliability.

In the technical scheme provided by this application example, the pilot is configured according to the system requirement information, to adaptively accommodate any changes in system requirements, thus improving the reliability of transmission and ensuring the communication quality, and further increasing the average system capacity while the reduced pilot overhead.

A FOURTH APPLICATION EXAMPLE

This application example gives an implementation that the CAP transmits the pilot configuration result.

Here, there are two preset time domain density ranges corresponding to wireless channel characteristics parameters, one of which includes a specific time domain density represented by a time domain pilot interval 0, and the other of which includes another specific time domain density represented by a time domain pilot interval 1. The time domain pilot interval 0 is a short pilot interval (which means OFDM symbols followed by each set of pilots), and the time domain pilot interval 1 is a long pilot interval (which means OFDM symbols followed by each set of pilots).

Here, assume the device capability information of the communication peer and the system requirement information respectively correspond to preset time domain density ranges which are the same as those for the above-described wireless channel characteristic parameters.

The CAP broadcasts the number of OFDM symbols indicated by the time domain pilot intervals 0 and 1 respectively, in the periodically broadcasted broadcast information frame (BCF), so that each STA may acquire these two parameters by detecting the BCF after accessing to a wireless network including the CAP.

After configuring the time domain pilot density for an STA in real time, the CAP indicates whether a time domain pilot interval 0 or a time domain pilot interval 1 is currently configured by 1 bit in the scheduling signaling on a control channel.

In this present application example, it is assumed that there are three preset frequency domain density ranges corresponding to the wireless channel characteristics parameters, where, the first preset frequency-domain density range includes a frequency domain density represented by a frequency domain pilot pattern 1, the second preset frequency domain density range includes a frequency-domain density represented by a frequency domain pilot pattern 2, and the third preset frequency domain density range includes a frequency domain density represented by a frequency domain pilot pattern 3. The frequency domain pilot pattern 1 is such that a pilot is inserted every 1 used subcarrier, the frequency domain pilot pattern 2 is such that a pilot is inserted every 2 used subcarriers, and the frequency domain pilot pattern 3 is such that a pilot is inserted every 4 used subcarriers.

Here, assume the device capability information of the communication peer and the system requirement information respectively correspond to preset time domain density ranges which are the same as those for the above-described wireless channel characteristic parameters.

After configuring the frequency domain pilot density for an STA in real time, the CAP indicates whether a frequency domain pilot pattern 1, a frequency domain pilot pattern 2 or a frequency domain pilot pattern 3 is currently configured by 2 bits in the scheduling signaling on a control channel.

The above application examples each are described in connection with demodulating pilots. However, the configuring method of the present invention can also be used for configuring other types of pilots, such as a sounding pilot.

Figure 6:
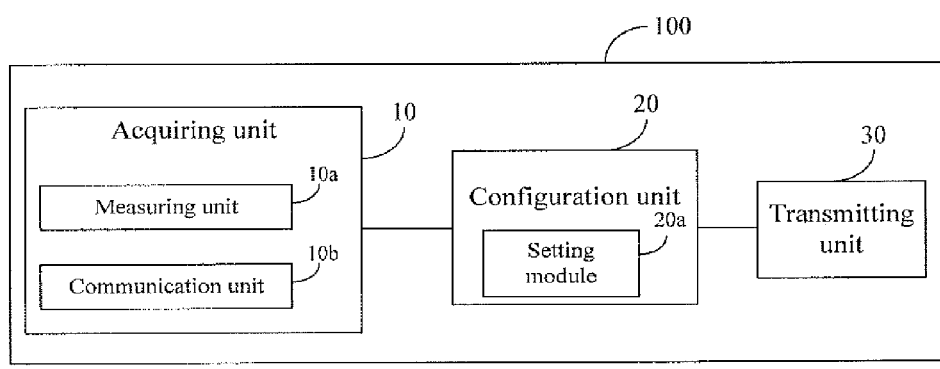
FIG. 6 is a diagram showing the structure of a device for configuring a pilot in an embodiment of the present invention.

The present invention provides a device 100 of configuring a pilot in a wireless communication system, as shown in FIG. 6, the device 100 includes:

a configuring unit 20, which is adapted to configure pilots in real time for different transmission in the transmission process based on at least one of current wireless channel characteristic parameters, device capability information of a communication peer, and system requirement information; and a transmitting unit 30, which is used to send a configuration result from the configuration unit 20 to the communication peer.

As an alternative embodiment, the device 100 may further include an acquiring unit 10, which is used for obtaining at least one of the wireless channel characteristic parameters, device capability information of a communication peer, and system requirement information. To obtain the wireless channel characteristic parameters, the acquiring unit 10 specifically includes:

a measuring unit 10a, which is used for measuring a wireless channel between the transmitting end and the receiving end, to obtain the wireless channel characteristic parameters; or a communication unit 10b, which is used for information interaction between the transmitting end and the receiving end, to obtain the wireless channel characteristic parameters.

As an alternative embodiment, the configuration unit 20 may further include: a setting module 20a, which is adapted to, in a resource block, set a preset OFDM symbol as a starting insertion location, determine OFDM symbols into which the pilots are to be inserted according to a result of configuring the time domain pilot density, then set a preset subcarrier as the starting insertion location for each of the OFDM symbols into which the pilots are to be inserted, and insert the pilots according to a result of configuring the frequency domain pilot density.

As an alternative embodiment, the configuration unit 20 may further include: a setting module 20a, which is adapted to, in a resource block, set a preset OFDM symbol as a starting insertion location, determine OFDM symbols into which the pilots are to be inserted according to a result of configuring the time domain pilot density, and then insert the pilots in preset subcarriers for each of the OFDM symbols into which the pilots are to be inserted.

As an alternative embodiment, the configuration unit 20 may further include: a setting module 20a, which is adapted to, in a resource block, set a preset subcarrier as a starting insertion location, determine subcarriers into which the pilots are to be inserted according to a result of configuring the frequency domain pilot density, and insert the pilots in the preset OFDM symbols for each of the subcarriers into which the pilots are to be inserted.

As an alternative embodiment, the configuration unit 20 operates as per the previously described configuration, and the transmitting unit 30 operates as per the transmission mode as described above.

The preferable embodiments of the invention have been disclosed as above, but are not used to limit the invention. One skilled in the art can make possible changes and modification according to the spirit and scope of the present invention. The protection range of the invention should be defined by the scope of the claim.

What is claimed is:

1. A method of configuring a pilot in a wireless communication system, comprising:
    configuring pilots in real time for different transmission in the transmission process, based on at least one of current wireless channel characteristic parameters, device capability information of a communication peer, and system requirement information; and
    sending a configuration result to the communication peer;
    wherein configuring pilots in real time comprises:
    configuring a time domain pilot density to be within a preset time domain density range corresponding to at least one of the current wireless channel characteristic parameters, device capability information of a communication peer and system requirement information;
    and/or configuring a frequency domain pilot density to be within a preset frequency domain density range corresponding to at least one of the current wireless channel characteristic parameters, device capability information of a communication peer and system requirement information;
    wherein the wireless channel characteristic parameters comprise: a wireless channel correlation bandwidth and wireless channel correlation time;
    the wider the wireless channel correlation bandwidth is, the less the corresponding frequency domain density within the preset the frequency domain density range is; and
    the longer the wireless channel correlation time is, the less the corresponding time domain density within the preset the time density range is.

2. The method of claim 1, wherein the device capability information of the communication peer comprises: frequency synchronization accuracy and/or sampling phase synchronization accuracy;
    the higher the frequency synchronization accuracy is, the less the corresponding time domain density within the preset time domain density range is, and the less the corresponding frequency domain density within preset frequency domain density range; and
    the higher the sampling phase synchronization accuracy is, the less the corresponding time domain density within the preset time domain density range is, and the less the corresponding frequency domain density within the preset frequency domain density range is.

3. The method of claim 2, wherein configuring the time domain pilot density to be within the preset time domain density range corresponding to the device capability information of the communication peer comprises: configuring the time domain pilot density to be within the preset time domain density range corresponding to at least one of the frequency synchronization accuracy and the sampling phase synchronization accuracy; and
    configuring the frequency domain pilot density to be within the preset frequency domain density range corresponding to the device capability information of the communication peer comprises: configuring the frequency domain pilot density to be within the preset frequency domain density range corresponding to at least one of the frequency synchronization accuracy and the sampling phase synchronization accuracy.

4. The method of claim 1, wherein the system requirement information comprises at least one of a modulation format, a coding scheme and a code rate;
    the higher the modulation order is, the larger the corresponding time domain density within the preset time domain density range is, and the larger the corresponding frequency domain density within the preset frequency domain density range is;
    the higher a code word error correction capability is, the less the corresponding time domain density within the preset time domain density range is, and the less the corresponding frequency domain density within the preset frequency domain density range is; and
    the higher the code rate is, the larger the corresponding time domain density within the preset time domain density range is, and the larger the corresponding frequency domain density within the preset frequency domain density range is.

5. The method of claim 4, wherein the system requirement information further comprises a coding scheme and/or a code rate;
    after being configured to be within the preset time domain density range corresponding to the system requirement information, the time domain pilot density is further finely adjusted according to a preset time domain adjustment value corresponding to the coding scheme and/or the code rate; and
    after being configured to be within the preset frequency domain density range corresponding to the system requirement information, the frequency domain pilot density is further finely adjusted according to a preset frequency domain adjustment value corresponding to the coding scheme and/or the code rate.

6. The method of claim 4, wherein, configuring the time domain pilot density to be within the preset time domain density range corresponding to the system requirement information comprises: configuring the time domain pilot density to be within the preset time domain density range corresponding to at least one of the modulation format, the code word error correction capability and the code rate; and
    configuring the frequency domain pilot density to be within the preset frequency domain density range corresponding to the system requirement information comprises: configuring the frequency domain pilot density to be within the preset frequency domain density range corresponding to at least one of the modulation format, the code word error correction capability and the code rate.

7. The method of claim 1, when configuring the time domain pilot density and the frequency domain pilot density, further comprising:

in a resource block, setting a preset OFDM symbol as a starting insertion location, determining OFDM symbols into which the pilots are to be inserted according to a result of configuring the time domain pilot density, then setting a preset subcarrier as the starting insertion location for each of the OFDM symbols into which the pilots are to be inserted, and inserting the pilots according to a result of configuring the frequency domain pilot density;

when configuring the time domain pilot density, further comprising: in a resource block, setting a preset OFDM symbol as a starting insertion location, determining OFDM symbols into which the pilots are to be inserted according to a result of configuring the time domain pilot density, and then inserting the pilots in preset subcarriers for each of the OFDM symbols into which the pilots are to be inserted;

when configuring the frequency domain pilot density, further comprising: in a resource block, setting a preset subcarrier as a starting insertion location, determining subcarriers into which the pilots are to be inserted according to a result of configuring the frequency domain pilot density, and inserting the pilots in the preset OFDM symbols for each of the subcarriers into which the pilots are to be inserted.

8. The method of claim 1, wherein, sending the configuration result to the communication peer comprises:

carrying information indicating the pilot configuration result in the signal sent to the communication peer;

or, sending signaling used to indicate the pilot configuration result to the communication peer via a control channel.

9. A device of configuring a pilot in a wireless communication system, comprising a processor and a storage device, wherein the storage device stores processor-executable programs, and the programs comprise:

a configuring unit, which is adapted to configure pilots in real time for different transmission in the transmission process based on at least one of current wireless channel characteristic parameters, device capability information of a communication peer, and system requirement information; and a transmitting unit, which is adapted to send a configuration result from the configuration unit to the communication peer;

wherein, the configuring unit is adapted to configure a time domain pilot density to be within a preset time domain density range corresponding to at least one of the current wireless channel characteristic parameters, device capability information of the communication peer, and system requirement information; and/or to configure a frequency domain pilot density to be within a preset frequency domain density range corresponding to at least one of the current wireless channel characteristic parameters, device capability information of the communication peer, and system requirement information;

wherein the wireless channel characteristic parameters comprise: a wireless channel correlation bandwidth and wireless channel correlation time;

the wider the wireless channel correlation bandwidth is, the less the corresponding frequency domain density within the preset the frequency domain density range is; and the longer the wireless channel correlation time is, the less the corresponding time domain density within the preset the time density range is.

10. The device of claim 9, wherein the device capability information of the communication peer comprises: frequency synchronization accuracy and/or sampling phase synchronization accuracy;

the higher the frequency synchronization accuracy is, the less the corresponding time domain density within the preset time domain density range is, and the less the corresponding frequency domain density within preset frequency domain density range; and the higher the sampling phase synchronization accuracy is, the less the corresponding time domain density within the preset time domain density range is, and the less the corresponding frequency domain density within the preset frequency domain density range is.

11. The device of claim 10, wherein the configuring unit configures the time domain pilot density to be within the preset time domain density range corresponding to the device capability information of the communication peer by configuring the time domain pilot density to be within the preset time domain density range corresponding to at least one of the frequency synchronization accuracy and the sampling phase synchronization accuracy; and the configuring unit configures the frequency domain pilot density to be within the preset frequency domain density range corresponding to the device capability information of the communication peer by configuring the frequency domain pilot density to be within the preset frequency domain density range corresponding to at least one of the frequency synchronization accuracy and the sampling phase synchronization accuracy.

12. The device of claim 9, wherein the system requirement information comprises at least one of a modulation format, a coding scheme and a code rate;

the higher the modulation order is, the larger the corresponding time domain density within preset time domain density range is, and the larger the corresponding frequency domain density within the preset frequency domain density range is;

the higher a code word error correction capability is, the less the corresponding time domain density within the preset time domain density range is, and the less the corresponding frequency domain density within the preset frequency domain density range is; and the higher the code rate is, the larger the corresponding time domain density within the preset time domain density range is, and the larger the corresponding frequency domain density within the preset frequency domain density range is.

13. The device of claim 12, wherein the system requirement information further comprises a coding scheme and/or a code rate;

after configuring the time domain pilot density to be within the preset time domain density range corresponding to the system requirement information, the configuring unit further finely adjusts the time domain pilot density according to a preset time domain adjustment value corresponding to the coding scheme and/or the code rate; and after configuring the frequency domain pilot density to be within the preset frequency domain density range corresponding to the system requirement information, the configuring unit further finely adjusts the frequency domain pilot density according to a preset frequency domain adjustment value corresponding to the coding scheme and/or a code rate.

14. The device of claim 12, wherein, the configuring unit configures the time domain pilot density to be within the preset time domain density range corresponding to the system requirement information by configuring the time domain pilot density to be within the preset time domain density range corresponding to at least one of the modulation format, the code word error correction capability and the code rate; and the configuring unit configures the frequency domain pilot density to be within the preset frequency domain density range corresponding to the system requirement information by configuring the frequency domain pilot density to be within the preset frequency domain density range corresponding to at least one of the modulation format, the code word error correction capability and the code rate.

15. The device of claim 9, wherein, the configuring unit comprises:

a setting module, which is adapted to, in a resource block, set a preset OFDM symbol as a starting insertion location, determine OFDM symbols into which the pilots are to be inserted according to a result of configuring the time domain pilot density, then set a preset subcarrier as the starting insertion location for each of the OFDM symbols into which the pilots are to be inserted, and insert the pilots according to a result of configuring the frequency domain pilot density; or the configuring unit comprises a setting module, which is adapted to, in a resource block, set a preset OFDM symbol as a starting insertion location, determine OFDM symbols into which the pilots are to be inserted according to a result of configuring the time domain pilot density, and then insert the pilots in preset subcarriers for each of the OFDM symbols into which the pilots are to be inserted; or the configuring unit comprises a setting module, which is adapted to, in a resource block, set a preset subcarrier as a starting insertion location, determine subcarriers into which the pilots are to be inserted according to a result of configuring the frequency domain pilot density, and insert the pilots in the preset OFDM symbols for each of the subcarriers into which the pilots are to be inserted.

16. The device of claim 9, wherein, the transmitting unit carries information indicating the pilot configuration result in the signal sent to the communication peer; or, sends signaling used to indicate the pilot configuration result to the communication peer via a control channel.

* * * * *